United States Patent [19]

Grout

[11] 4,090,963
[45] May 23, 1978

[54] SOFTENING UNIT FOR APPLIANCE

[75] Inventor: Edward C. Grout, Sun Prairie, Wis.

[73] Assignee: Sta-Rite Industries, Inc., Racine, Wis.

[21] Appl. No.: 754,628

[22] Filed: Dec. 27, 1976

Related U.S. Application Data

[63] Continuation of Ser. No. 613,290, Sep. 15, 1975, abandoned.

[51] Int. Cl.² .............................................. C02B 1/22
[52] U.S. Cl. ................................. 210/130; 68/13 A; 137/513.5; 137/517; 210/190
[58] Field of Search .................... 68/13 A; 137/513.3, 137/513.5, 517; 210/100, 130, 190, 191, 263, 287, 99, 111, 117, 133, 136

[56] References Cited

U.S. PATENT DOCUMENTS

| 407,981 | 7/1889 | Williams | 137/513.3 |
|---|---|---|---|
| 3,016,146 | 1/1962 | Smith et al. | 210/190 |
| 3,474,906 | 10/1969 | Tennis | 210/130 |
| 3,680,703 | 8/1972 | Borochaner | 210/190 |

*Primary Examiner*—Charles N. Hart
*Assistant Examiner*—Ivars Cintins
*Attorney, Agent, or Firm*—Mason, Kolehmainen, Rathburn & Wyss

[57] ABSTRACT

A water softening unit positioned between the mixing valve and washing basket of a washing machine includes a housing having a water inlet and outlet and an inlet for the introduction of salt into the housing. A partition divides the housing into a regeneration chamber and an ion-exchange chamber communicating with one another at one end of the partition. A pressure relief valve is located in the partition. A flow restriction valve located between the housing inlet and the regeneration chamber restricts flow through the softening unit when actuated, thereby allowing complete and thorough regeneration. The valve is normally open and when operated manually or otherwise to its alternate or actuated position, it remains in its actuated condition until the regeneration operation is completed.

2 Claims, 2 Drawing Figures

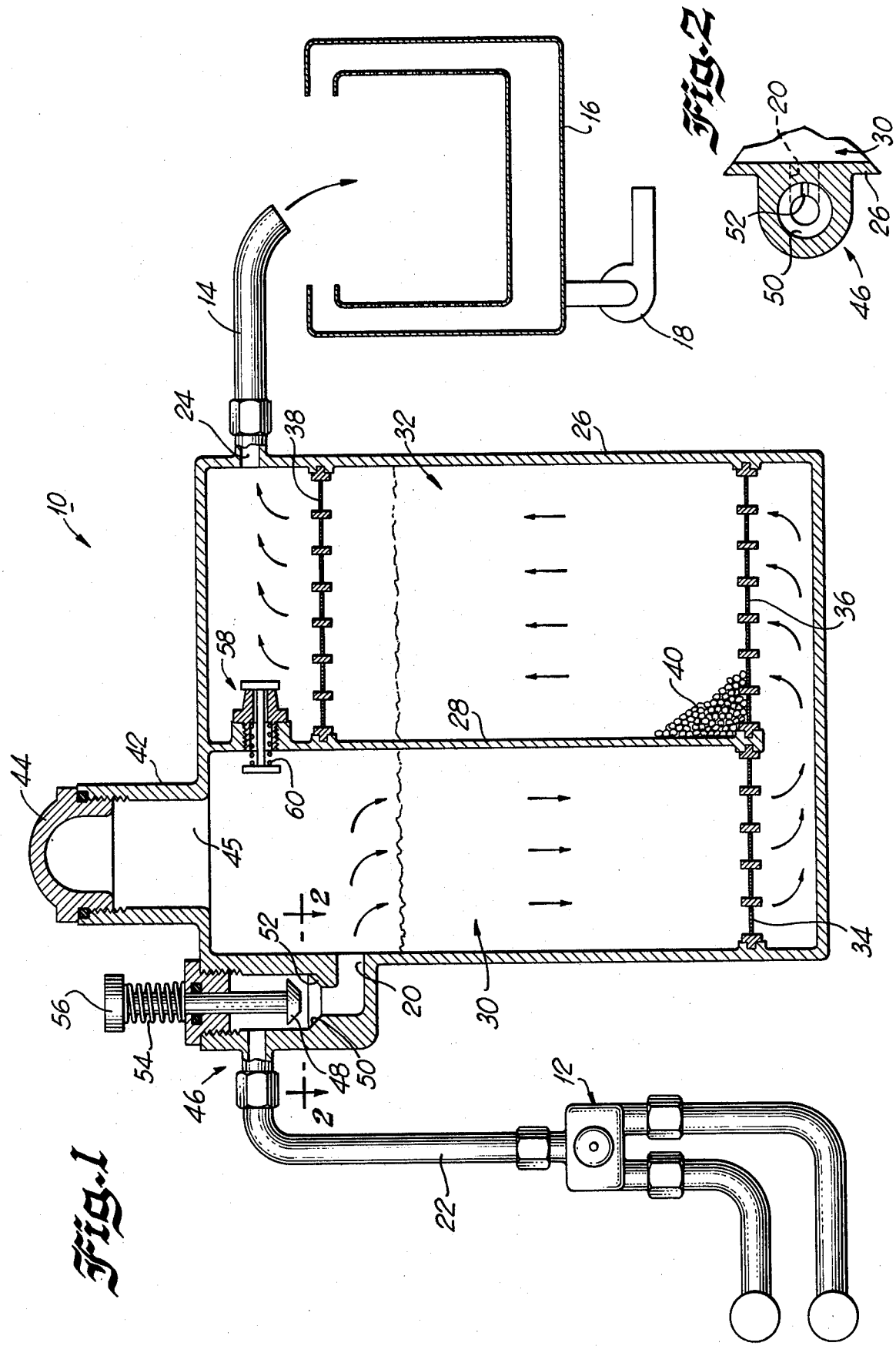

SOFTENING UNIT FOR APPLIANCE

This application is a continuation of application Ser. No. 613,290 filed Sept. 15, 1975, now abandoned.

BACKGROUND OF THE INVENTION

A. Field of the Invention

The present invention relates to a new and improved water softening unit that is positioned between a washing machine mixing valve and the washing machine basket, and to a valve for the water softening unit.

B. Description of the Prior Art

In many locations the available water supply contains large quantities of minerals rendering the water hard and undesirable for many uses such as washing clothes. Typically, to surmount this problem water softeners are included in the household and are connected to the municipal water line. The water is softened by this unit for use by the various family service units such as the washing machine.

In order to avoid the expense of softening the entire household water supply, water softening units have been proposed that may be attached to the washing machine and positioned between the appliance and its mixing valve. Typically, such softeners employ solenoid operated regenerating valves and special contacts on the cycle timer of the appliance to operate the regeneration cycle.

An example of this type of prior art water softening unit is disclosed in the U.S. Pat. No. 3,680,703. The device described in that patent includes a mixing valve actuated by a solenoid. The solenoid is electrically connected to a timer mechanism that operates the washing machine through its various cycles and is also used to activate the regeneration cycle.

SUMMARY OF THE INVENTION

An object of the present invention is to provide a new and improved device for softening a fluid from a fluid supply.

Another object of the present invention is to provide a new and improved softener to be positioned between the mixing valve and the washing basket of a washing machine.

An additional object of the present invention is to provide a water softener that utilizes the existing electric controls of the washing machine to regenerate the ion-exchange material.

It is a further object of the present invention to provide a new and improved device for softening water that can be attached to the water line and that employs a valve that restricts the flow into the regeneration chamber of the water softener to allow more efficient and effective dissolution of the salt.

A further object of the present invention is to provide a new and improved device that will soften water and is of a light construction.

An additional object of the present invention is to provide a new and improved water softener that need not require electrical valves, contacts or circuits.

An additional object of the present invention is to provide a new and improved flow restriction valve.

Briefly, the present invention is directed to a new and improved device, commonly referred to as a water softener, for softening hard water from a municipal water supply for use in an appliance such as a washing machine. The water softener unit includes a housing having a water inlet and outlet. The housing further includes a partition defining a salt chamber and an ion-exchange chamber within the housing.

In accordance with an important feature of the present invention, the water softening unit includes a flow restriction valve that may be located in the path of water flowing through the softener, for example, between the inlet of the water softening unit and the inlet of the salt or regeneration chamber. The valve includes a seat and a valve element biased to an open position by a spring. A restricted passage bypasses the valve. Subsequent to the actuation of the washing machine and the initiation of water flow through the machine's mixing valve, the flow restriction valve is depressed manually or otherwise allowing fluid to pass only through the restricted passage. This flow creates a pressure differential across the valve thereby maintaining the valve element against the seat without further actuation manually or otherwise. The restricted flow permits efficient dissolution of the salt to produce brine, and further permits the brine to pass through the resin bed in the ion-exchange chamber at a proper flow rate.

This procedure of regenerating the ion-exchange resin positioned in the ion-exchange chamber of the water softener is accomplished through the utilization of the ordinary controls on the washing machine. More specifically, the controls of the washing machine are actuated to the normal washing cycle position. Once the flow through the mixing valve and into the softener has commenced, the valve element may be moved into the seat. The pressure drop across the valve will maintain the valve in its actuated condition and the valve element no longer needs to be held in the seat by external means. In this position, the flow through the valve is restricted resulting in more efficient and effective dissolution of the salt chamber and consequent regeneration of the resin bed.

This regeneration continues for the duration of the wash cycle. Upon completion of the wash cycle, the flow through the mixing valve is halted, and the valve automatically releases due to the dissipation of the pressure drop across the valve. The machine then proceeds into its fill cycle whereupon the brine is pumped out of the machine's wash tub and fresh water is introduced in the system. This water completely washes away any trace of brine. At the completion of this cycle, the water softener has been completely regenerated and normal washing procedures may commence.

In accordance with a further important feature of the present invention, there is located in the partition separating the two chambers a low-pressure bypass relief valve operable to prevent excessive pressure build-up created by clogging of the resin bed.

BRIEF DESCRIPTION OF THE DRAWING

To the accomplishment of the foregoing and related ends, the invention comprises the features hereinafter fully described and particularly pointed out in the claims, the following description and annexed drawing setting forth in detail a certain illustrative embodiment of the invention.

In the annexed drawing:

FIG. 1 is an elevational view of a water softener positioned between a mixing valve and the washing basket of a washing machine and includes a flow restriction valve constructed in accordance with the principle of the present invention; and FIG. 2 is an enlarged, cross-sectional view taken along line 2—2 of FIG. 1.

DESCRIPTION OF THE PREFERRED EMBODIMENT

The present invention embodies the principle that a pressure drop in a fluid system may be employed to maintain a restriction in the system to reduce flow. Such a system also includes means to eliminate the restriction upon termination of the flow. Such an invention may be used in many systems. For example, a back wash control for a swimming pool filter. The preferred embodiment, however, is a water softener used on an appliance such as a washing machine.

With reference to FIG. 1, there is schematically illustrated a system employing an improved water softener 10 constructed in accordance with the principles of the present invention. In order to soften water used in an appliance such as a washing machine, the improved softener 10 is installed between the outlet of the hot and cold water mixing valve 12 and the fill hose 14 leading to the basket or tub 16 of the washing machine. The tub 16 has installed at the bottom thereof a pump 18 that is actuated by the controls (not shown) of the washing machine to pump water out of the basket or tub 16.

More specifically, the inlet 20 of the water softener 10 is connected by a pipe or hose 22 to the mixing valve 12. In this manner, the inlet 20 of the water softener 10 is in fluid communication with the mixing valve 12 and thus with the household water source. Similarly, the outlet 24 of the water softener 10 is connected to the hose 14. Accordingly, all water passing through the mixing valve 12 passes through the water softener 10 and into the tub 16 of the washing machine.

By positioning the water softener 10 between the mixing valve 12 and the tub 16 rather than upstream of the mixing valve 12, the water softener 10 is not subjected to full line pressure. Consequently, the housing 26 of the softener 10 may be constructed of lightweight materials thereby reducing the cost of manufacturing the softener 10. For example, the housing may be fabricated of plastic.

As will be described herein, one of the novel features of the softener 10 is that it need not be regenerated on every cycle of the washing machine although it continuously softens water supplied to the tub 16 of the washing machine. In addition, regeneration of the softener 10 is automatic. Also, the softener 10 may be attached to any existing washing machine and requires no special valves or timer contacts.

In a specific embodiment, softener 10 comprises a housing 26 fabricated from lightweight materials having an inlet 20 and an outlet 24. Additionally, softener 10 includes an internal partition 28 that may be constructed from the same material as housing 26. Partition 28 divides the interior of the water softener 10 into two separate chambers 30 and 32. These separate chambers 30 and 32 are the regeneration or salt chamber 30 and the ion-exchange or resin chamber 32. To allow fluid to flow through the water softener 10, the regeneration chamber 30 and resin chamber 32 are in fluid communication at the lower end of the partition 28.

The bottom of each chamber 30 and 32 has a screen 34 and 36, respectively, that allows fluid to pass from one chamber to the other, but prevents solid particles such as salt or resin 40 from flowing from one chamber to the other. In addition, the ion-exchange or resin chamber 32 includes at its upper end another screen 38 that allows fluid to pass from the chamber 32 and through outlet 24, but prevents resin 40 from escaping.

During normal operation, water flows from the mixing valve 12 into the inlet 20 of the softener 10, passing substantially unrestricted through the chambers 30 and 32, and is softened by the resin 40. The water then flows out of the outlet 24 and into the washing machine tub 16 where it is used for its intended purpose. Consequently, during normal operation chamber 30 is empty, while chamber 32 is partially full of resin 40. Since the chamber 32 is not completely filled with resin 40, water passing through chamber 32 forces the resin 40 to expand upward and back wash to some extent thus preventing a pressure drop increase across the bed 40 as a result of accumulation of foreign material introduced by the service water and filtered by the resin 40.

After a period of time and several washing cycles, the resin 40 becomes depleted of its ion-exchange or softening capability. The resin 40 may then be regenerated. More specifically, salt (not shown) is introduced into the regeneration chamber 30 through a salt inlet generally designated as 42. The salt inlet 42 includes a removable, threaded cap 44. Cap 44 may be unscrewed from the inlet 42 and salt poured through the opening 45 and into chamber 30. Prior to regeneration, the cover or cap 40 is threaded back on the inlet 42.

To commence the regeneration process, the washing machine is started on a normal wash cycle which typically begins with a fill cycle. During this cycle, water begins to flow from the mixing valve 12 into the inlet 20 of the softener 10. However, typically, the water from the mixing valve 12 is flowing at too rapid a rate for efficient dissolution of the salt in the salt chamber 30 and for complete regeneration of the resin 40.

In accordance with an important feature of the present invention, to restrict the flow of water through the salt chamber 30 during the regeneration process, softener 10 includes a novel flow restriction valve designated generally as 46. Flow restriction valve 46 comprises a valve element 48 and a corresponding valve seat 50. In accordance with a novel feature of the invention, the valve defined by element 48 and seat 50 is bypassed by a restricted passage. In the illustrated arrangement, the valve seat 50 includes a bleed notch 52 (FIG. 2).

In its normal unactuated condition, the valve element 48 is held out of engagement with the valve seat 50 by a spring 54. Once water begins to flow through the restriction valve 46 in response to starting of the washing machine through a normal wash cycle, the valve 46 may be actuated by moving element 48 into engagement with seat 50. This may be accomplished manually by pushing upon the handle portion 56 of the valve element 48 or by other means well known in the art. Once the flow restriction valve 46 is actuated in this manner, the valve element 48 covers the valve seat 50 except for notch 52. Water flows through this notch 52 and enters the salt chamber 30 at the desired flow rate; dissolving the salt at an efficient rate to produce brine. This brine, under the influence of the water flow, passes through and regenerates the exhausted resin 40 in chamber 32. The brine then proceeds through the outlet 24 and fill hose 14 into the tub 16 of the washing machine.

The water flow through the notch 52 creates a pressure drop across valve 46 that will maintain the valve element 48 in contact with seat 50 as long as fluid is flowing through the flow restriction valve 46 or as long as the washing machine is operating in its fill cycle. When the washing machine completes its fill cycle, the pressure across the flow restriction valve 46, and particularly the valve element 48 and seat 50 is relieved and under the influence of the spring 54, the valve element 48 returns to its normal position.

Consequently, an operator of the washing machine may first start the washing machine on its fill or wash cycle then actuate the flow restriction valve 46 by manually depressing the valve element 48 into contact with the seat 50. Once the pressure drop across the element 48 and seat 50 is sufficient, the operator may release the actuating pressure and the element 48 and seat 50 will remain engaged. Upon completion of the fill cycle, the valve element 48 will automatically return to its normal position and valve 46 no longer restricts flow.

The next cycle of the machine is normally a wash cycle followed by a rinse cycle. Accordingly, the wash or salt water is pumped out of the wash tub 16 by pump 18 and fresh water is introduced into the system unrestricted by the flow restriction valve 46. This fresh water flows through the chambers 30 and 32 at a high rate and rinses away any last trace of salt from the system and the wash tub 16. At the completion of this cycle, the resin 40 is regenerated and normal washing procedures may be resumed until the resin 40 in the chamber 32 is again depleted whereupon the above described cycle may be repeated.

As mentioned previously, foreign matter in the water flowing through the softener 10 is often filtered by the resin 40. This foreign matter may eventually clog or greatly reduce the flow through resin 40 and chamber 32 causing a build up of pressure.

In accordance with an important feature of the present invention, the softener 10 includes a low-pressure relief valve generally indicated as 58. This low-pressure relief valve is positioned between the inlet 20 and the outlet 24 of the softener 10. In the specific embodiment illustrated, the relief valve 58 is located in the partition 28. In a specific embodiment of the preferred invention, the bypass relief valve comprises a spring 60 tensioned such that no more than 15 psi builds up in the softener 10. Once foreign material gathers in the resin 40 to an extent that flow is restricted through the softener 10 and creates a pressure build up greater than 15 psi, the bypass relief valve 58 will allow the pressure to escape thus preventing rupturing of the housing 26.

Obviously many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A water softening unit for use in a water supply conduit wherein water is intermittently supplied to an appliance at a predetermined flow rate, said unit comprising:

a housing including a regeneration chamber and an ion exchange chamber;

said housing including an opening for the admission of salt into said regeneration chamber;

conduit means communicating with said regeneration and ion exchange chambers and defining a water flow path through said chambers in series flow relation with the water supply conduit;

and the improvement comprising a selective flow restriction valve in said conduit means for selectively reducing flow from the predetermined flow rate to a smaller flow rate;

said valve including a housing having an inlet and outlet along said water flow path;

a valve seat between said inlet and outlet;

a valve member movable from a closed position against said seat to an open position spaced from said seat;

a restricted bypass in parallel flow relation with said valve seat for providing said smaller flow rate when said valve member is in the closed position;

a valve operating means connected to said valve member for selectively moving said valve member from the open to the closed position;

said valve member in the open position being located in said flow path upstream of said valve seat and subject to flow induced valve closing forces during said predetermined flow and said smaller flow; and spring means biasing said valve member toward said open position with a force larger than the valve closing force induced by said predetermined flow and smaller than the valve closing force induced by said smaller flow.

2. The unit claimed in claim 1 further comprising pressure relief means for relieving pressure above a preselected magnitude in said housing.

* * * * *